United States Patent
Brick et al.

(10) Patent No.: US 8,474,347 B2
(45) Date of Patent: Jul. 2, 2013

(54) HIGH EFFICIENCY RIGHT ANGLE GEARBOX

(75) Inventors: David W. Brick, Bristol, WI (US); Simon Odland, Aberdeen, SD (US); H. Oscar Schlenker, Aberdeen, SD (US); James Michael Campbell, Aberdeen, SD (US)

(73) Assignee: Hub City, Inc., Aberdeen, SD (US)

( * ) Notice: Subject to any disclaimer, the term of this patent is extended or adjusted under 35 U.S.C. 154(b) by 764 days.

(21) Appl. No.: 12/480,379

(22) Filed: Jun. 8, 2009

(65) Prior Publication Data

US 2010/0307270 A1    Dec. 9, 2010

(51) Int. Cl.
*F16H 1/18* (2006.01)
*F16H 1/12* (2006.01)

(52) U.S. Cl.
USPC ............................... 74/416; 74/413

(58) Field of Classification Search
USPC ............ 74/416, 319, 412 R, 420, 421 R, 74/421 A
See application file for complete search history.

(56) References Cited

U.S. PATENT DOCUMENTS

| | | | |
|---|---|---|---|
| 2,566,253 A * | 8/1951 | Schmitter | 74/420 |
| 3,862,672 A * | 1/1975 | Tappen et al. | 184/6.12 |
| 4,148,262 A * | 4/1979 | Eichinger | 105/131 |
| 4,270,408 A | 6/1981 | Wagner | |
| 4,428,249 A | 1/1984 | Henk | |
| 5,203,231 A | 4/1993 | Minegishi et al. | |
| 5,375,479 A | 12/1994 | Kouno et al. | |
| 5,509,862 A | 4/1996 | Sherman | |
| 5,816,116 A | 10/1998 | Antony et al. | |
| 6,032,550 A | 3/2000 | Rugh | |
| 7,100,469 B2 | 9/2006 | Takechi | |
| 2003/0141127 A1 | 7/2003 | Kobayashi | |
| 2005/0028626 A1 | 2/2005 | Fleytman | |
| 2005/0028627 A1 | 2/2005 | Fleytman | |
| 2006/0219037 A1 | 10/2006 | Inose et al. | |
| 2007/0022836 A1 | 2/2007 | Shigemi et al. | |
| 2008/0230289 A1 | 9/2008 | Schoon et al. | |
| 2009/0084211 A1 | 4/2009 | Aoyama et al. | |

FOREIGN PATENT DOCUMENTS

| | | |
|---|---|---|
| EP | 0666969 B1 | 3/1997 |
| EP | 0992711 A3 | 4/2000 |
| EP | 1212554 B1 | 6/2002 |

(Continued)

OTHER PUBLICATIONS

GTM/GTMR Series High-Precision Gearboxes for Servo Motors; Rexroth Bosch Group; Jan. 2003; US; 16 pages.

(Continued)

*Primary Examiner* — David M Fenstermacher
*Assistant Examiner* — Terence Boes
(74) *Attorney, Agent, or Firm* — Armstrong Teasdale LLP

(57) ABSTRACT

A right angle gearbox is described that includes an enclosure, an input member, an output member, and an assembly. The enclosure has dimensions such that the gearbox is operable as a drop in replacement for a gearbox that includes a worm gear set. The input member extends from the enclosure and includes a first portion of a helical gear set housed within the enclosure. The output member extends from the enclosure and includes a second portion of a hypoid gear set housed within the enclosure. The output member is substantially orthogonal to the input member. The assembly includes a second portion of the helical gear set and a first portion of the hypoid gear set mechanically coupled to one another.

21 Claims, 8 Drawing Sheets

FOREIGN PATENT DOCUMENTS

| | | |
|---|---|---|
| EP | 0944789 B1 | 3/2004 |
| JP | 2000074161 A | 3/2000 |
| JP | 2000120845 A | 4/2000 |
| WO | 9410482 | 5/1994 |
| WO | 9826201 | 6/1998 |
| WO | 2008118625 A2 | 10/2008 |

OTHER PUBLICATIONS

Hyponic Efficiency Pays Product Data Sheet; Sumitomo Drive Technologies; 2008; US; 2 pages.

International Search Report and Written Opinion issued in International Application No. PCT/US 10/37753, mailed Mar. 5, 2012, 13 pages.

International Preliminary Report on Patentability issued in International Application No. PCT/US 10/37753. mailed Mar. 22, 2012, 9 pages.

Indusco, Ltd; Single Worm Speed Reducers; http://www.indusco.com/delroydsingle.htm; retrieved Aug. 7, 2012; pp. 1.

Engineer Student; Understanding Gears; EngineerStuden.co.uk; dated 2010; pp. 3.

Burdick, Roger; Manufacturing Single-Enveloping Worm Gear Sets; gearsolutions.com; dated Apr. 2003; pp. 28-33.

An English language translation of a first Office Action issued by the Chinese Patent Office, dated Feb. 4, 2013, for co-pending CN patent application No. CN 201080025279.9 (8 pages).

\* cited by examiner

HIGH EFFICIENCY RIGHT ANGLE GEARBOX

BACKGROUND OF THE INVENTION

The field of the invention relates generally to gearboxes, and more specifically, to a high efficiency right angle gearbox.

Energy conservation is a global initiative and a high priority for many industrial organizations. There is a strong need to introduce power transmission components that exhibit lower power transmission losses during operation. Current worm gear drives typically achieve full-load power transmission efficiencies in the range of 45-90%, depending on the gear ratio, which leads to a conclusion that current industrial worm gear reducer offerings, which are produced by various manufacturers, are inefficient. Helical-bevel gear reducer offerings produced by various manufacturers are large, heavy, costly, and do not interchange with current worm gear applications.

Gearbox efficiency is defined as the power output divided by the power input, for example, the output horsepower (or watts) divided by the input horsepower (or watts). Gearbox inefficiency is one minus the gearbox efficiency. Most of the inefficiency in a gearbox manifests itself as heat which is generated by one or more of the gear mesh, oil drag, bearing rotation, and seal drag.

If such units could be replaced with a unit that provides, for example, gear drive exhibiting operating efficiencies in excess of 85% across a similar range of gear ratios, the amount of energy wasted by the machines in which they are used would be greatly reduced. More specifically, end users of such gearboxes would realize lower operating costs through the reduction in the energy expended.

BRIEF DESCRIPTION OF THE INVENTION

In one aspect, a right angle gearbox is provided that includes an enclosure, an input member extending from the enclosure and comprising a first portion of a helical gear set housed within the enclosure, an output member extending from the enclosure and comprising the secondary portion of a hypoid gear set housed within the enclosure, and an assembly including a second portion of the helical gear set and a first portion of the hypoid gear set. The output member is substantially orthogonal to the input member, and the enclosure has dimensions such that the gearbox is operable as a drop in replacement for a gearbox that includes a worm gear set. The second portion of the helical gear set and the first portion of the hypoid gear set are mechanically coupled to one another, and the assembly is positioned such that the second portion of the helical gear set engages the first portion of the helical gear set, and such that the second portion of the hypoid gear set engages the first portion of the hypoid gear set.

In another aspect, a gearbox is provided that includes an input member comprising a first portion of a helical gear set disposed thereon, an output member comprising a second portion of a hypoid gear set disposed thereon, where the output member has a longitudinal axis substantially orthogonal to a longitudinal axis of the input member. The gearbox further includes a second portion of the helical gear set mounted for rotatable engagement with the first portion of the helical gear set, a first portion of the hypoid gear set mechanically coupled to the second portion of the helical gear set and rotatably coupled to the first portion of the hypoid gear set, and an enclosure. The input member and the output member extend from said enclosure, wherein the longitudinal axis associated with the output member is between the rotatable coupling of the first and second portions of the helical gear set and an intersection between the input member and the enclosure.

In still another aspect, a gearing configuration is provided. The configuration includes a helical gear set configured for attachment to an input member, and a hypoid gear set configured for attachment to an output member. The output member has a longitudinal axis associated therewith that is substantially orthogonal to a longitudinal axis associated with the input member. The helical gear set is positioned behind the longitudinal axis of the hypoid gear set, with respect to the input member.

DETAILED DESCRIPTION OF THE INVENTION

The described embodiments provide a methodology for minimizing power transmission losses (i.e., maximize operating efficiency), while offering a drop-in interchange with respect to a current industrial worm gear product.

The described embodiments are directed to a right angle gearbox that is functionally and aesthetically similar to current industrial worm gear products, but with significantly higher operating efficiency and higher power transmission capabilities. The gearbox embodiments include mounting parameters that allow for drop-in replacement of certain currently available worm gear drives. As such, accessories that may accompany such gearboxes are similar to those offered with current available worm gear drives.

With respect to gearing, and as further described below, the described embodiments include both helical and hypoid gear reductions that result in a higher operating efficiency for the gearbox. In one specific embodiment, the gearbox includes a helical primary gear set in communication with a hypoid secondary gear set which results in higher power ratings than worm drives of an equivalent size. In other words, the described embodiments provide a higher power density.

In some embodiments, an enclosure for the described gearboxes is configured so that the gearbox can be utilized as a drop-in replacement for a current worm gear product with an appearance that closely resembles current worm gear products. In one embodiment, this functionality is provided due to the placement of a helical primary gear set behind a centerline associated with a hypoid secondary gear set, as further described below. In certain embodiments, the enclosure is also capable of withstanding a wash down environment. In still other embodiments, anti-reversing options are built into the gearbox.

The embodiments described include a gearbox and motorized gearbox products that operate as a drop-in replacement for the above mentioned inefficient worm gear drives. Such drives are currently installed throughout a large variety of industrial applications. As further described below, the described gearbox utilizes helical and hypoid gear geometry to significantly reduce the inefficient sliding action inherent in traditional worm gearing, and may also be used in conjunction with high-efficiency motors to significantly reduce the energy losses of the motor/gearbox system. To accommodate applications where back-driving is not acceptable, an optional anti-reversing mechanism may be included. To accommodate motion control applications, the gearbox may include minimum backlash gearing and/or servo motor flange options.

Figure 1:
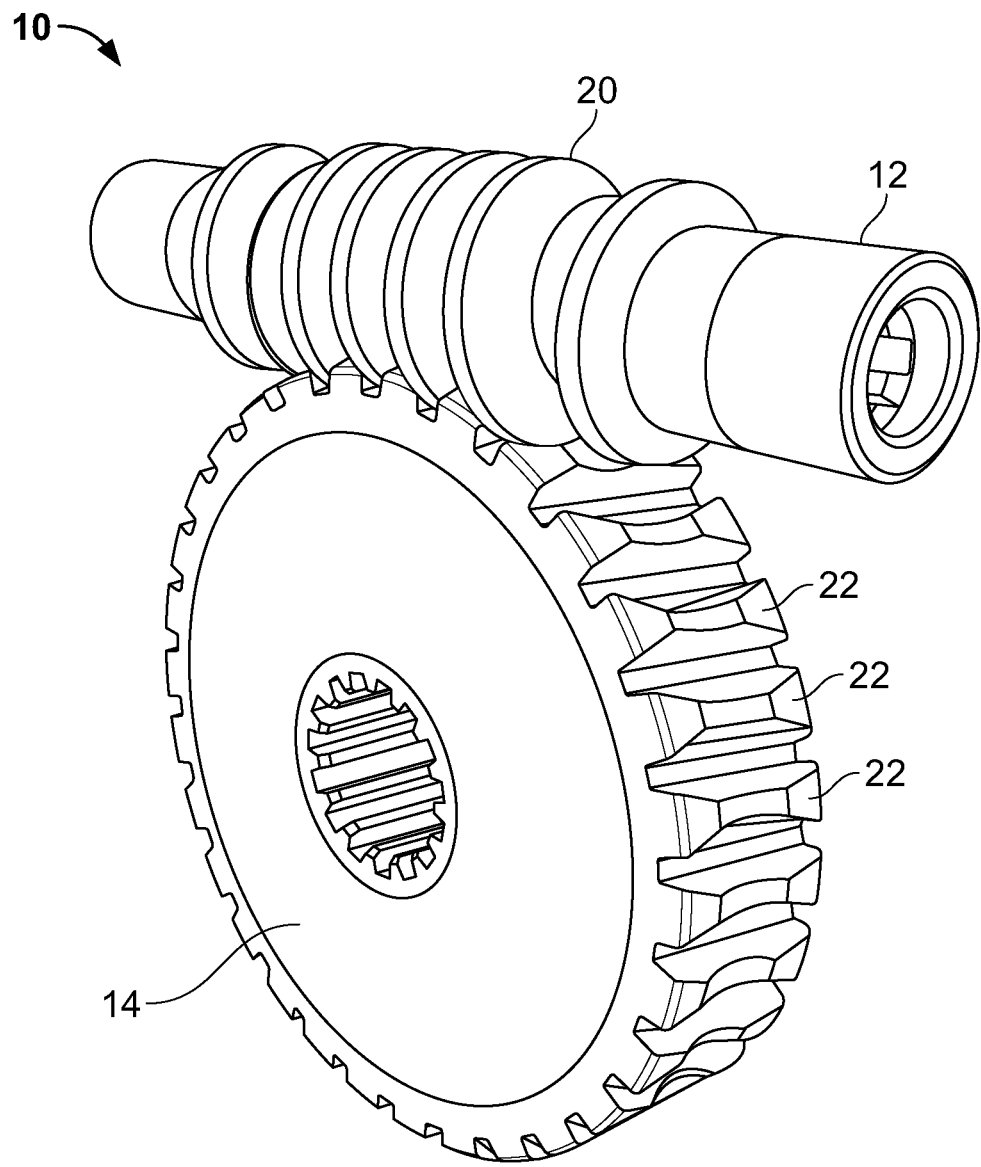
FIG. 1 is a diagram of a traditional worm and worm gear.

Now referring to the drawings, FIG. 1 is a diagram of a traditional worm gear set 10. Worm gear set 10 includes an input member (worm) 12 and an output member (worm gear or worm wheel) 14. Input shaft 12 includes a helical worm lead 20 which engages teeth 22 of the output gear 14. As input shaft rotates, the worm lead 20 imparts a rotational force onto output gear 14, the axis of which is substantially orthogonal to that of the input shaft 12. The embodiment shown in FIG. 1 is an illustration of what is sometimes referred to as worm gearing.

Figure 2:
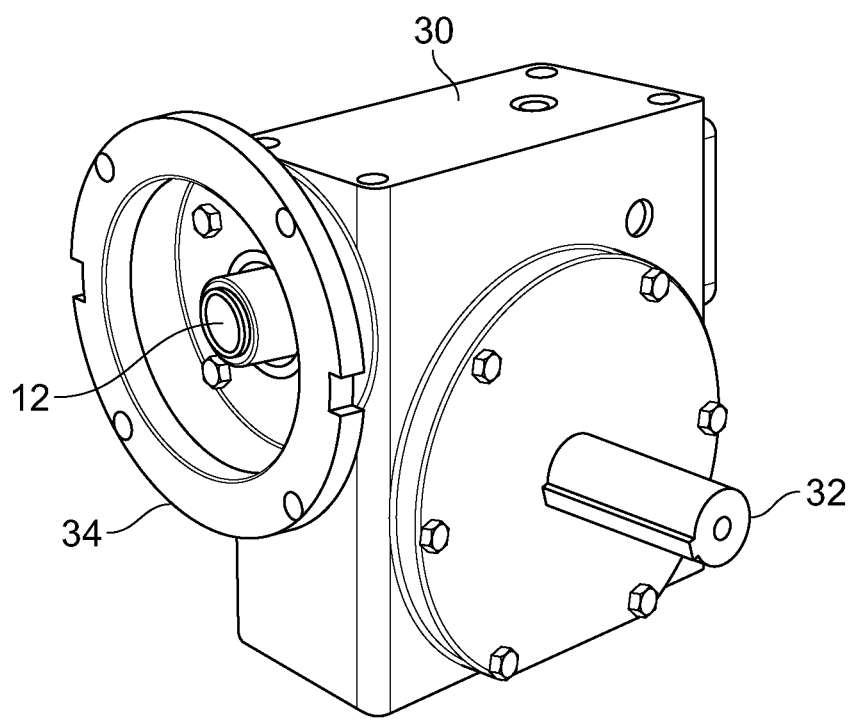
FIG. 2 is a diagram illustrating the worm and worm gear of FIG. 1 within an enclosure.

Worm gear reduction occurs because of the size and number of teeth 22 associated with output gear 14 and their engagement with the worm lead 20 of input shaft 12. In other words, it takes multiple rotations of the input shaft 12 to impart a single complete rotation of the output gear 14. In a typical application, industrial worm gear drives utilize a single worm gear reduction (shown in FIG. 1) in an enclosed housing. The input shaft 12 may be embodied, for example, as a motor flange or as a solid shaft, or as another configuration while the output gear 14 is usually mechanically connected to a solid output shaft extending therethrough or as a hollow bore (shown in FIG. 1) which a shaft engages, though other configurations are contemplated. FIG. 2 is a diagram illustrating a right angle gearbox 30 which incorporates the worm gear set 10 within. FIG. 2 also includes notations indicating the input shaft 12 and an output shaft 32. The input shaft 12 is associated with a motor flange 34 and as is easily understood, a portion of shaft 32 engages output gear 14 which is contained within the enclosure 30.

Figure 3A:
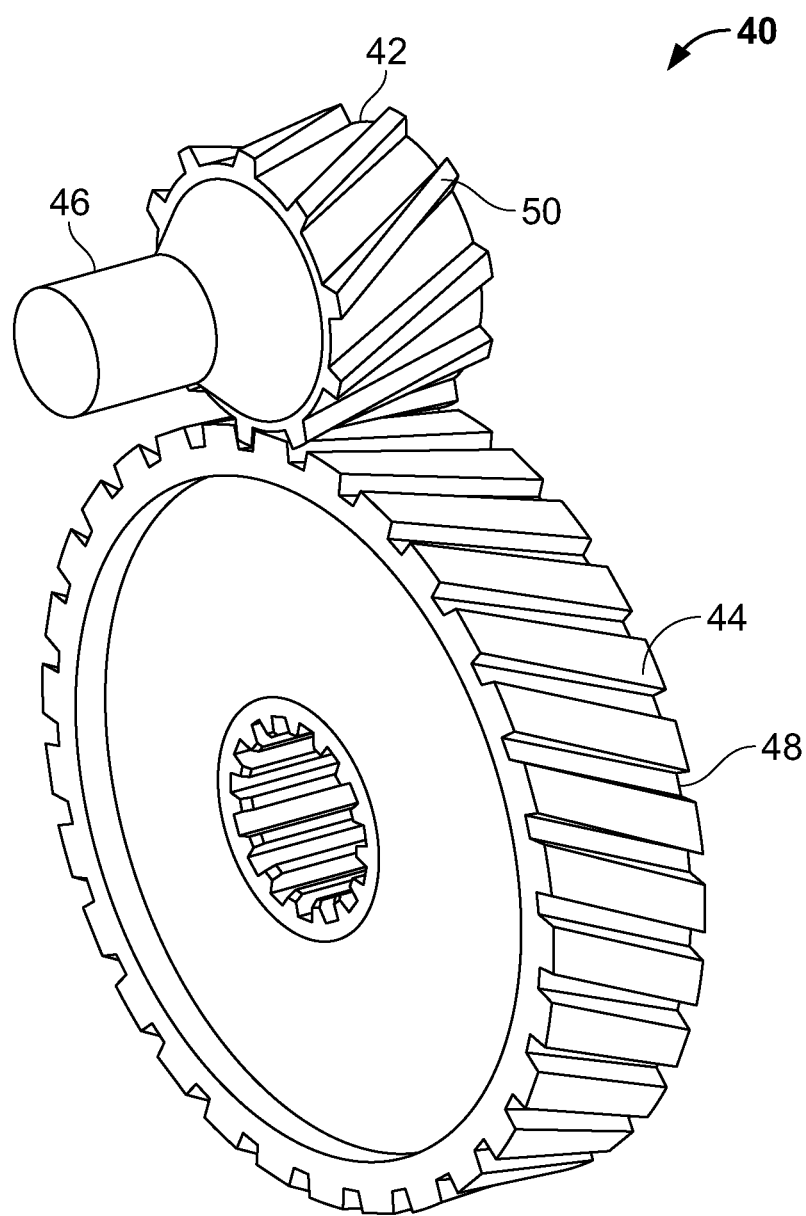
FIG. 3A is an illustration of a helical gearing mechanism.

FIG. 3A is an illustration of a helical gear 40. In helical gearing, a high speed gear 42 is planar with respect to a low speed gear 44. Essentially, and comparing to the worm gear 10 of FIG. 1, the shaft 46 associated with input gear 42 is rotated 90 degrees from the position of input shaft 12. The angle of gear teeth 48 and 50, which is not collinear with an axis or rotation of the gears 42 and 44 is what gives rise to the term helical.

Figure 3B:
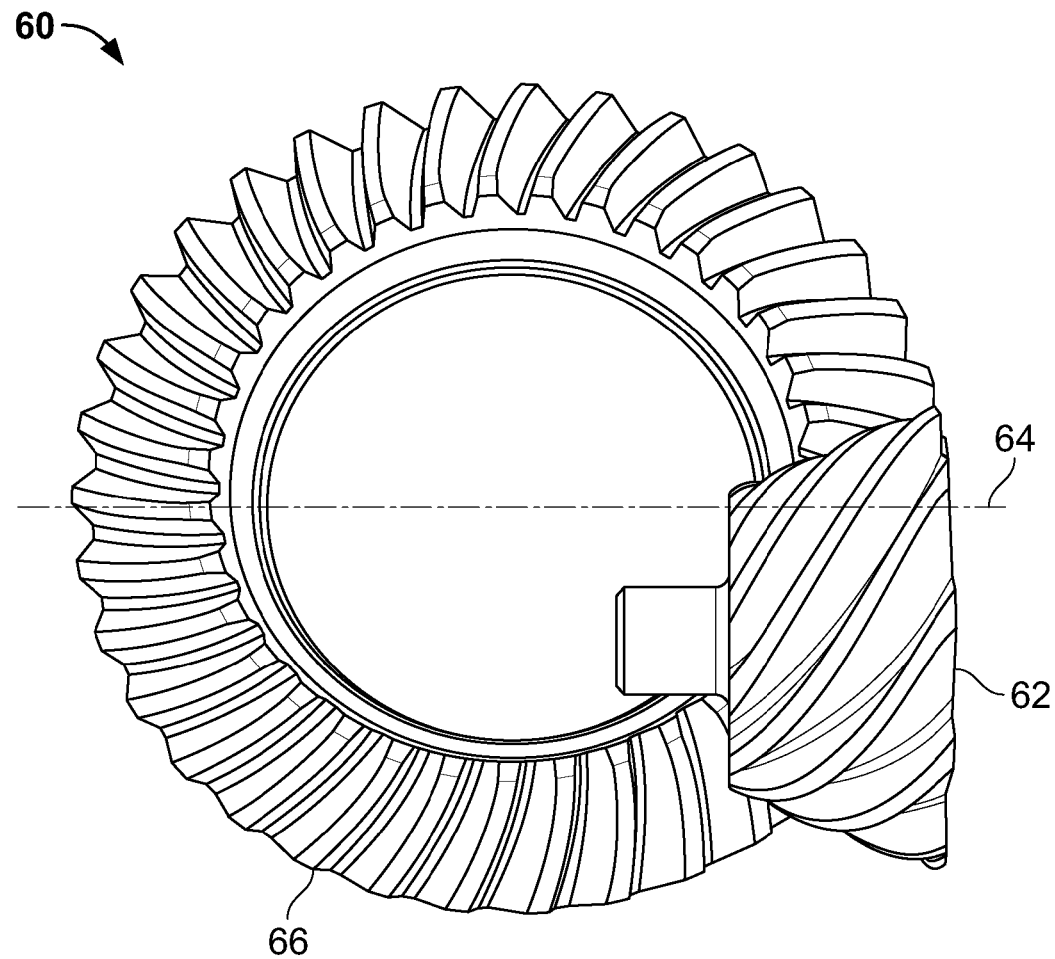
FIG. 3B is an illustration of a hypoid gearing mechanism.

FIG. 3B is an illustration of a hypoid gear set 60. Hypoid gearing is similar to spiral bevel gearing, except the pinion 62 (which is generally the high-speed member) is offset from a centerline 64 of a ring gear 66 (which is generally the low-speed member). Shaft angles between the pinion 62 and ring gear 66 are typically orthogonal, though offset (as shown).

Figure 4:
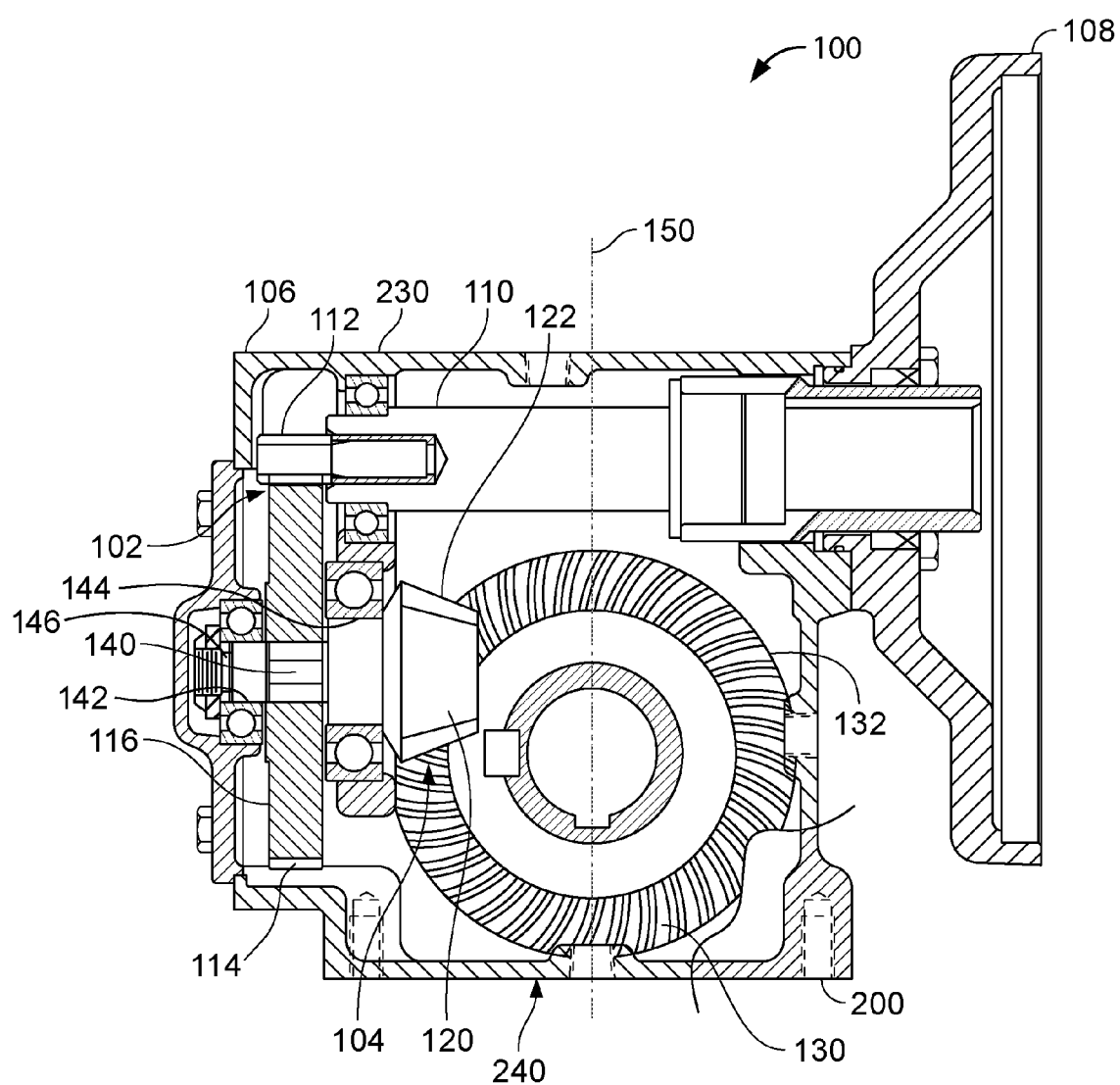
FIG. 4 is a side cross-sectional view of a right angle gearbox that includes a substantially parallel axis helical gear set in combination with a substantially orthogonal axis hypoid gear set.

FIG. 4 is a side cross-sectional view of a right angle gearbox 100 which incorporates both helical and hypoid gearing. In one embodiment, the right angle gearbox 100 utilizes a substantially parallel axis helical gear set 102 in combination with a substantially orthogonal axis hypoid gear set 104 to achieve total ratios similar to those traditionally facilitated with a worm gear set, but at a significantly higher operating efficiency. In one embodiment, helical gear set 102 is a parallel axis helical or spur gear set. In one embodiment, hypoid gear set 104 is an orthogonal axis hypoid gear set.

In one specific embodiment, the helical gear set 102 and the hypoid gear set 104 have a total gear reduction ratio between about 3:1 and about 100:1. One specific application utilizes a total gear reduction ratio of about 60:1. It should be noted that the external configuration (enclosure 106) of right angle gearbox 100 is similar to enclosure 30 shown in FIG. 2 and in the embodiment shown includes a motor flange 108 facilitating motor drive of the helical gear set 102. This is one intended application for right angle gearbox 100, specifically, utilization as a direct drop-in replacement for a traditional worm gear drive such as is described with respect to FIGS. 1 and 2.

The configuration of gearbox 100 utilizes helical (or spur) and hypoid gear reductions, in combination, to achieve gear ratios, speed reduction, and torque multiplication typically facilitated by conventional worm gear drives. However, the described configuration provides these features at a higher operating efficiency than a traditional worm gear-based gearbox. Specifically, the configuration achieves higher rated power transmission capacity than a worm gear drive of similar input to output shaft offset, which is sometimes referred to as an overall center distance. In various alternative embodiments, gearbox 100 provides reductions in speed from an input member to an output member that range from approximately 3:1 to 100:1. The configuration is lower in cost, smaller in overall size, quicker to assemble, and has a lower product weight than current industry offerings that utilize helical and bevel gear combinations.

In various embodiments, and depending somewhat on end application, the helical gear set 102 and the hypoid gear set 104 include gearing that is one or more of ferrous, non-ferrous, engineered plastic, or a combination thereof. The enclosure 106 associated with gearbox 100 facilitates adjustment of one or both hypoid gears to attain optimum gear placement during the gearbox assembly process. Gearing embodiments have been contemplated to accommodate applications that require minimum backlash.

Helical gear set 102 includes a shaft 110 that includes high speed gearing member 112. High speed gearing member 112 is configured to engage the gearing 114 disposed about the perimeter of low speed gearing member 116. Rotation of low speed gearing member 116 thereby results in rotation of pinion 120 which includes hypoid gearing 122 disposed thereon, and which operates as the high speed gearing member for hypoid gear set 104. The pinion 120 and associated hypoid gearing 122 engages the mating hypoid gearing 130 that is disposed on ring gear 132 which operates as the low speed gear of hypoid gear set 104. Ring gear 132 is configured to engage an output shaft or otherwise operate as the output to gearbox 100 as described elsewhere herein.

In one embodiment, a mechanical mounting apparatus 140 is positioned within enclosure 106. In the illustrated embodiment, the mechanical mounting apparatus 140 includes bearings 142 and 144. In this embodiment, the low speed gearing member 116 and the pinion 120 share an axis of rotation. In a specific embodiment, the low speed gearing member 116 has a centrally located bore, and a shaft 146 associated with pinion 120 extends through this bore. The shaft 146 and the low speed gearing member 116 are coupled to one another, for example, using a common shaft keyway and shaft key arrangement. The bearings 142 and 144 are configured to engage the shaft 146 to maintain a placement of the pinioin 120, and therefore the low speed gearing member 116 of gear set 102.

As such, the second portion of the helical gear set 102 (low speed gear member 116) mechanically engages the pinion 120 portion of the hypoid gear set 104 forming an assembly. It should be noted that with respect to an input device such as motor flange 108, the engagement between the helical gear set 102 and the hypoid gear set 104 occurs behind the center line 150 of the hypoid gear set 104 which provides operational and packaging benefits as further described elsewhere herein. Placement of helical gear set 102 may necessitate enlargement of enclosure 106 in that area, but for most drop in replacement applications this has a minimal impact, if any.

Ring gear 132 is a low speed member that may be configured to include or be attached to a solid output shaft or configured as or be attached to a hollow output device. As mentioned herein, to provide the drop in replacement capability, a shaft/bore height of ring gear 132 with respect to gearbox mounting surfaces 230 and/or 240 is the same as currently available industrial worm gear drives. These features are provided either by machining the housing to that dimension or offering product accessories that effectively simulate the required shaft/bore height from the mounting surfaces 230 and/or 240, or may be modified to accommodate customer needs. Shaft and/or bore lengths and diameters are also similar to currently available industrial worm gear drives, or may be modified to accommodate customer needs.

The high-speed shaft 110 may be configured as a solid shaft, a hollow quill, or may be integral to the motor shaft and may be provided with standard industrial electric, servo, or hydraulic motor frames. Low-speed shaft/gear subassembly 120 and 132 and the accommodating housing configuration is symmetrical as to allow the rotation direction of the gearbox output shaft in relation to the rotation of the input shaft to be reversed by installing the low-speed subassembly with the gear on the opposite side of the housing centerline 160 (shown in FIG. 5).

In the described embodiments, the gearbox 100 has a helical gear set 102 that operates as the primary gear set and a hypoid gear set 104 that operates as the secondary gear set. Reasons for configuring the gearbox 100 with a helical primary and a hypoid secondary are that such a configuration allows for some utilization of existing components, but more importantly a range of gearing ratios can be offered at a lower, near-constant cost. For example, in the arrangement described above, a larger low speed gearing member 116 may be utilized to engage the shaft 146 of pinion 120 to provide additional reduction from input to output.

Generally, hypoid gears are more costly to manufacture than helical gears, and larger gears (low-speed gear sets) are more expensive to manufacture than smaller gears (high-speed gear sets). No matter the configuration (hypoid or helical), the higher the production volume, the lower the manufacturing costs. By using hypoid gears for the low-speed set (gear set 104), and helical gears for the high-speed set (gear set 102), costs can be minimized. The cost savings comes about due to keeping the ratio associated with the hypoid gear set constant, which in turn keeps the production volume as high as possible on the largest gear set that is also the most expensive gear geometry (hypoid).

Figure 5:
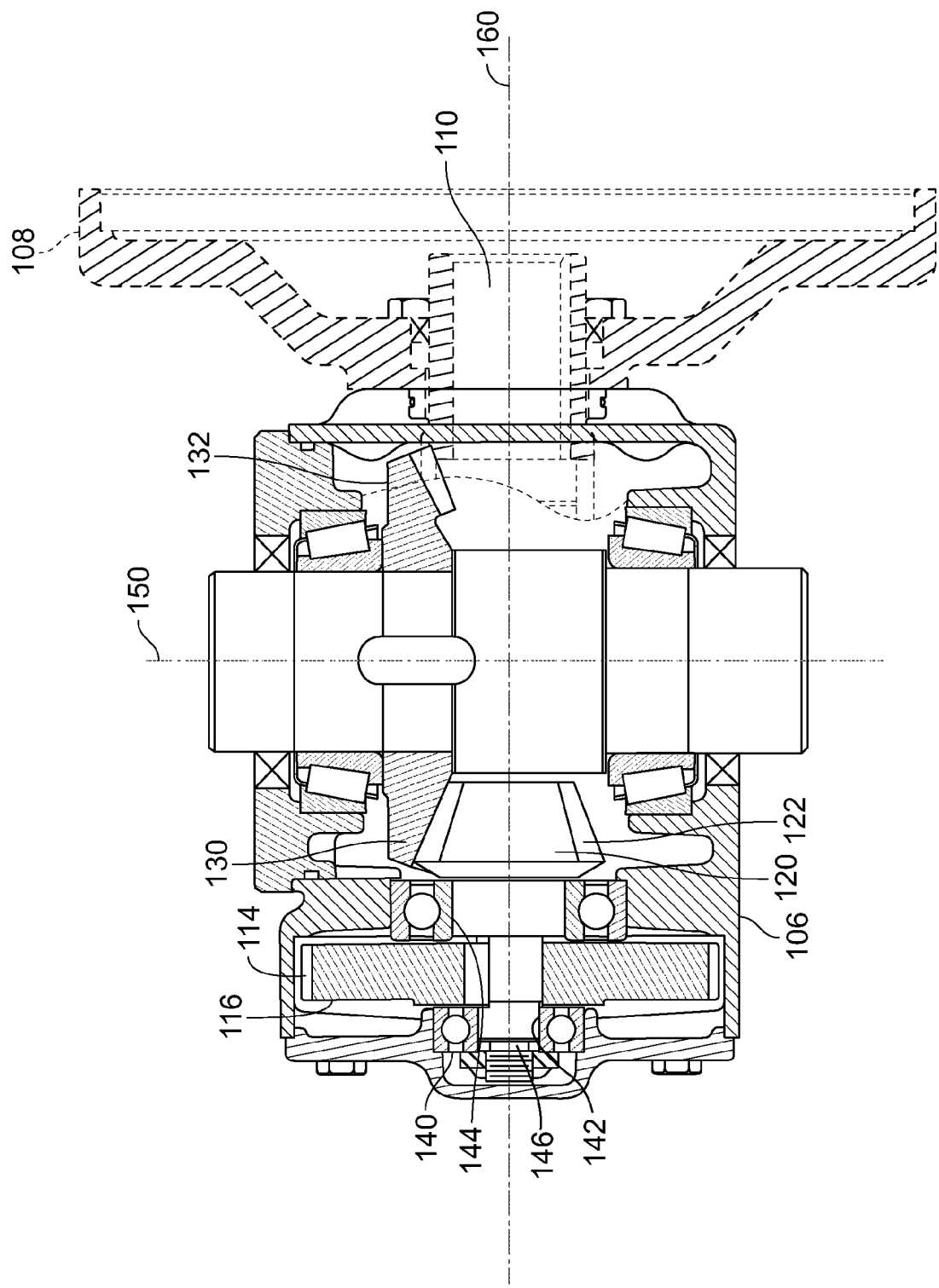
FIG. 5 is a top cross-sectional view of the right angle gearbox of FIG. 4.

FIG. 5 is a top view of gearbox 100. The configuration with the helical gear set being "behind" the centerline 150 of the hypoid gear set also allows for the arrangement of the internal components into a package that closely resembles existing worm gear products. More specifically, the configuration described herein helps facilitate gearbox 100 as a drop-in replacement, exhibiting a similar package form to existing worm gear products. The similarity in package configuration is particularly beneficial when mounting the gearbox 100 in close proximity to other equipment.

Explaining further, the helical gear set 102 is placed on the side of the gearbox 100, opposite the input shaft 110. In such a configuration, the additional components and resulting housing "bulk" ends up on the side of the gearbox 100 which is typically the lowest area of concern, at least with regards to clearances when mounting on or near other equipment. The configuration of gearbox 100 offers a higher overall torque rating than similarly sized worm gear boxes. For example, a low-speed hypoid gear set 104 is smaller than a worm gear set with the same torque rating. Conversely, a low-speed hypoid gear set 104 has a greater torque rating than a worm gear set of equal size.

Figure 6:
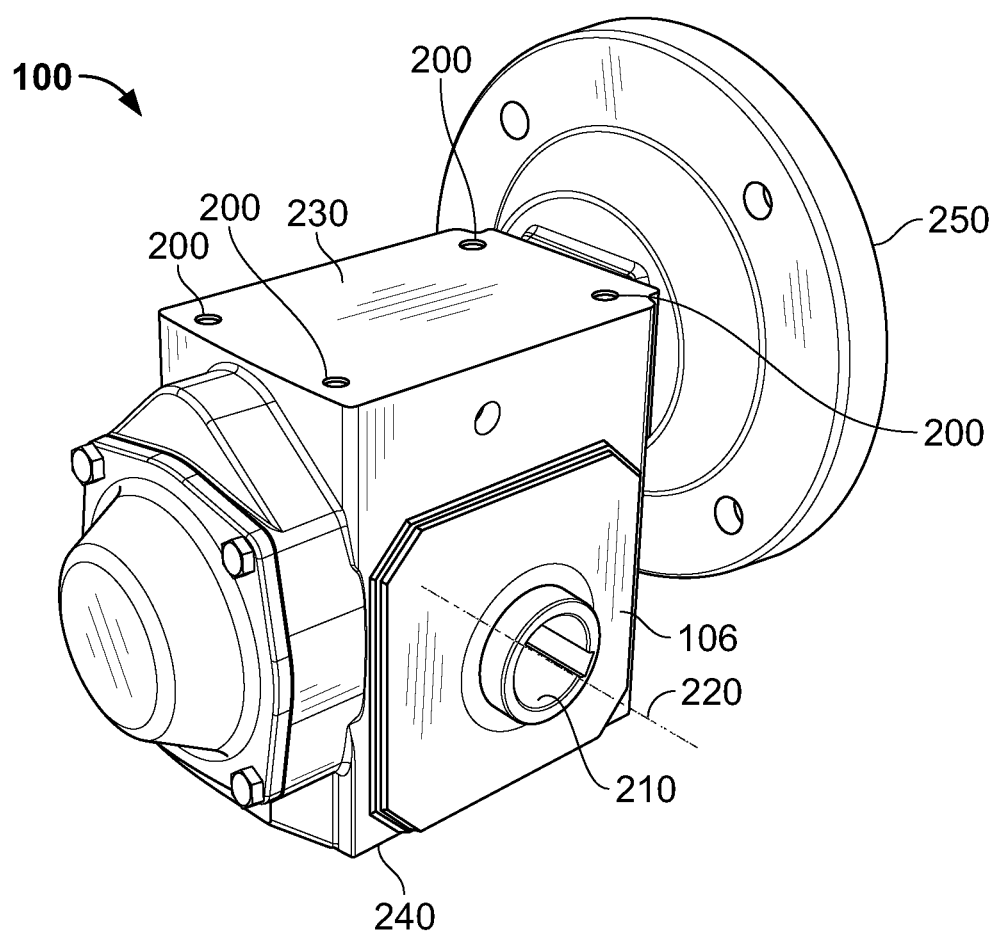
FIG. 6 is an illustration of one embodiment of a packaging configuration for the right angle gearbox of FIGS. 4 and 5, including a motor flange input and a hollow bore output.

FIG. 6 is an illustration of one embodiment of a packaging configuration for the right angle gearbox 100 described with respect to FIGS. 4 and 5. With respect to enclosure 106, it has an overall appearance resembling currently available worm gear drives. This feature is believed to provide customers and end users with a product (gearbox 100) that is aesthetically comparable and exhibits the appearance of a rugged, well-designed product. The enclosure 106, in various embodiments, is constructed from one or more of sealed ferrous, non-ferrous, and engineered plastic. Mounting accommodations, such as mounting holes 200, within enclosure 106 are arranged as to allow gearbox 100 to be utilized as a direct interchange (drop-in replacement) for the above mentioned currently available industrial worm gear products. For example, one or both of top mounting holes 200 and bottom mounting holes (not shown) can be sized and located to offer a direct interchange with currently manufactured industrial worm gear products.

In alternative embodiments, however, enclosure 106 and gearbox 100 may be modified to accommodate the needs associated with a specific application. Also, a direct interchange of the vertical distance between the output shaft or bore centerline 220, the top mounting surface 230 and the bottom mounting surface 240 is achieved by machining the housing 106 or by adding one or more base plates. For example, a spacer plate attached to the bottom mounting surface 240 of enclosure 106 may be utilized to increase the height of the input and output interfaces to the gearbox 100. As seen in FIG. 6, surfaces of enclosure 106 are generally flat, with minimal interruptions to reduce cleaning time and therefore operating costs. Such features likely impact industries, for example food preparation industries, that currently use other right angle drive configurations (e.g., worm gear drives).

Figure 7:
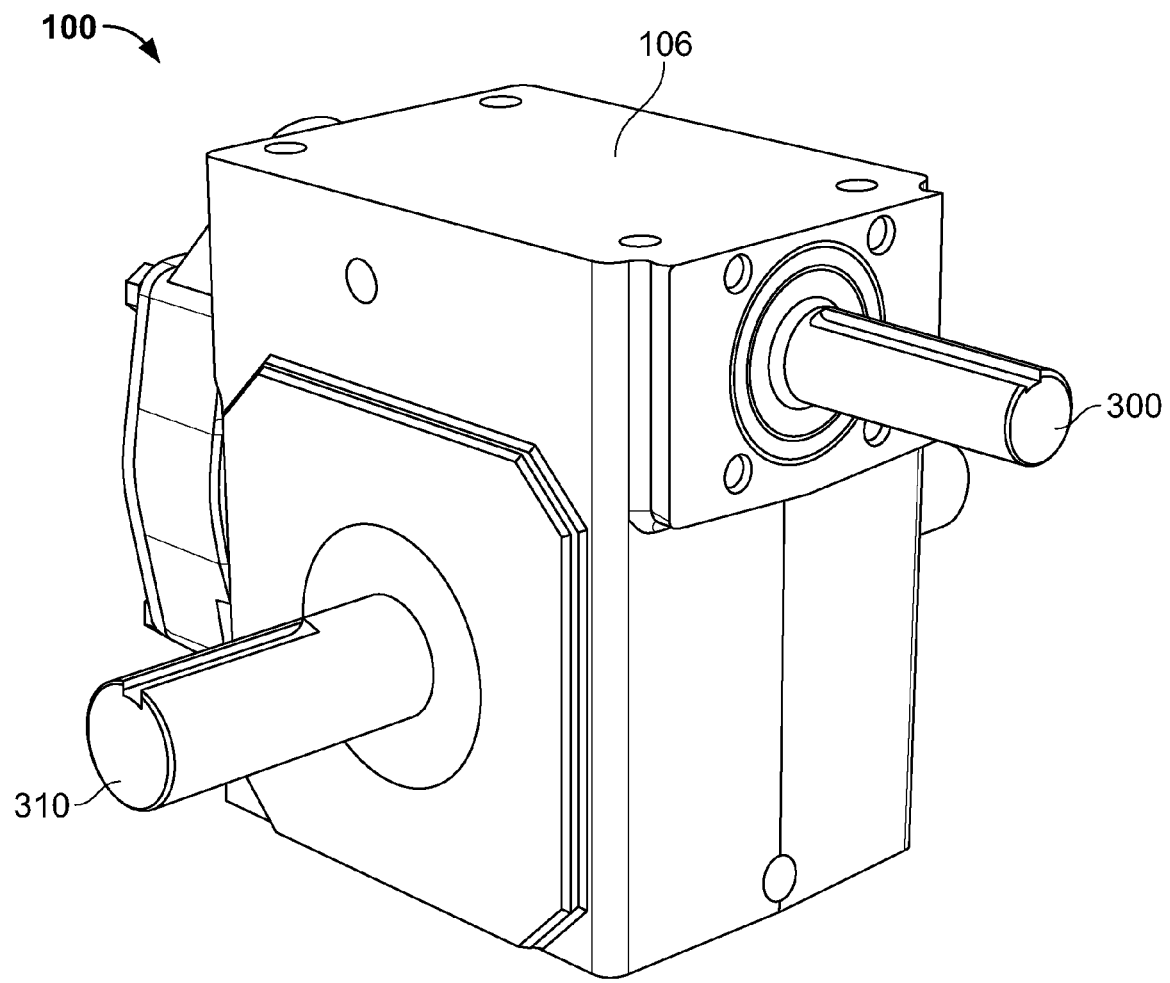
FIG. 7 is an illustration of one embodiment of a packaging configuration for the right angle gearbox of FIGS. 4 and 5, including a shaft input and a shaft output.

Alternatively to utilization as a drop in replacement for a worm gear drive, the embodiments described herein, gearbox 100 may also be packaged with an electric motor attached thereto. In one embodiment of such a configuration, the motor is mounted using a motor flange 250, such as one of a C-face, a servo motor flange, or other integral motor mounting practices. Motors that may be attached to gearbox 100 include an induction motor, a brushless AC motor, a brushless DC motor, a permanent magnet motor, or a servo motor to achieve maximum operating efficiency of the gearbox/motor package. Servo motor options better facilitate motion control applications when used in conjunction with gearbox 100. FIG. 7 is an illustration of gearbox 100 where instead of a motor flange at the input and a bore at the output, an input shaft 300 and an output shaft 310 are utilized.

There are a number of manufacturers that produce right-angle gearboxes using helical and either worm or bevel reductions to achieve high gear reductions and improved operating efficiencies. However, these products are not operable as drop-in worm drive replacements, and are typically very expensive when compared to worm drives. The embodiments described herein provide a less expensive alternative and generally include optional mounting parameters to allow drop-in replacement of helical-worm and helical-bevel gearboxes.

This written description uses examples to disclose the best mode, and also to enable any person skilled in the art to practice the described embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A right angle gearbox comprising:
   a gear set enclosure housing a helical gear set and a hypoid gear set;
   an input member extending from said enclosure and comprising a high speed portion of said helical gear set housed within said enclosure, said high speed portion of said helical gear set having a first centerline;
   an output member extending from said enclosure and comprising a low speed portion of said hypoid gear set housed within said enclosure, said output member substantially orthogonal to said input member; and
   an assembly comprising a low speed portion of said helical gear set and a high speed portion of said hypoid gear set having a second centerline, said low speed portion of said helical gear set and said high speed portion of said hypoid gear set mechanically coupled to one another, said assembly positioned such that said low speed portion of said helical gear set engages said high speed portion of said helical gear set and said high speed portion of said hypoid gear set engages said low speed portion of said hypoid gear set, wherein a diameter of said high speed portion of said helical gear set is smaller than a diameter of said low speed portion of said helical gear set,
   wherein said first centerline and said second centerline are aligned such that said centerlines are oriented in the same vertical plane, said output member being perpendicular to any line that can be drawn within the vertical plane.

2. A right angle gearbox according to claim 1 wherein said helical gear set comprises a parallel axis helical or spur gear set.

3. A right angle gearbox according to claim 1 wherein said hypoid gear set comprises an orthogonal axis hypoid gear set.

4. A right angle gearbox according to claim 1 wherein:
   said low speed portion of said hypoid gear set comprises a ring gear; and
   said high speed portion of said hypoid gear set comprises a pinion gear, said pinion gear offset from a centerline associated with said ring gear.

5. A right angle gearbox according to claim 1 comprising reductions in speed from said input member to said output member that range from approximately 3:1 to approximately 100:1.

6. A right angle gearbox according to claim 1 further comprising an electric motor coupled to said input member.

7. A right angle gearbox according to claim 1 wherein a centerline associated with said output member is between the engagement between said high speed portion and said low speed portion of said helical gear set and a position where said input member extends from said enclosure.

8. A right angle gearbox according to claim 1 further comprising a plurality of mounting holes formed within said enclosure, said mounting holes are arranged to allow said gearbox to be utilized as a direct interchange for at least one gearbox that incorporates a worm gear.

9. A right angle gearbox according to claim 1 further comprising at least one base plate operable for attachment to said enclosure for adjusting a height of said input member and said output member with respect to a specific application.

10. A right angle gearbox according to claim 1 wherein:
    said low speed portion of said helical gear set comprises a centrally located bore therethrough; and
    said high speed portion of said hypoid gear set comprises a shaft extending therefrom, said shaft configured to engage said bore to mechanically couple said low speed portion of said helical gear set to said high speed portion of said hypoid gear set.

11. A right angle gearbox according to claim 10 wherein said shaft comprises a keyway formed therein, said bore configured to engage a portion of a shaft key placed in said keyway.

12. A gearbox comprising:
    an input member comprising a high speed portion of a helical gear set disposed thereon, said high speed portion having a first centerline;
    an output member comprising a low speed portion of a hypoid gear set disposed thereon, said output member having a longitudinal axis substantially orthogonal to a longitudinal axis of said input member;
    a low speed portion of said helical gear set mounted for rotatable engagement with said high speed portion of said helical gear set, wherein a diameter of said high speed portion of said helical gear set is smaller than a diameter of said low speed portion of said helical gear set;
    a high speed portion of said hypoid gear set mechanically coupled to said low speed portion of said helical gear set and rotatably coupled to said low speed portion of said hypoid gear set, said high speed portion of said hypoid gear set having a second centerline; and
    a gear set enclosure housing said helical gear set and said hypoid gear set, said input member and said output member extending therefrom, wherein the longitudinal axis associated with said output member is between the rotatable coupling of the high speed and low speed portions of said helical gear set and an intersection between said input member and said enclosure, and wherein said first centerline and said second centerline are aligned such that said centerlines are oriented in the same vertical plane, said output member being perpendicular to any line that can be drawn within the vertical plane.

13. A gearbox according to claim 12 wherein said enclosure comprises dimensions and said input member and said output member are oriented such that said gearbox is operable as a drop in replacement for a gearbox that includes a worm gear set.

14. A gearbox according to claim 12 wherein said helical gear set comprises a parallel axis helical gear set and said hypoid gear set comprises an orthogonal axis hypoid gear set.

15. A gearbox according to claim 12 further comprising an electric motor coupled to said input member.

16. A gearbox according to claim 12 wherein:
    said low speed portion of said hypoid gear set comprises a ring gear; and
    said high speed portion of said hypoid gear set comprises a pinion gear, said pinion gear offset from a centerline associated with said ring gear.

17. A gearbox according to claim 12 wherein said gear sets are configured to provide reductions in speed from said input member to said output member that range from approximately 3:1 to 100:1.

18. A gearbox according to claim 12 further comprising a plurality of mounting holes formed within said enclosure, said mounting holes are arranged to allow said gearbox to be utilized as a direct interchange for at least one gearbox that incorporates a worm gear.

19. A gearbox according to claim 12 further comprising at least one base plate operable for attachment to said enclosure for adjusting a height of said input member and said output member with respect to a specific application.

20. A gearbox according to claim 12 wherein to mechanically couple said high speed portion of said hypoid gear set to said low speed portion of said helical gear set, said low speed portion of said helical gear set comprises a centrally located bore therethrough, and said high speed portion of said hypoid gear set comprises a shaft extending therefrom, said shaft configured to engage said bore to mechanically couple said low speed portion of said helical gear set to said high speed portion of said hypoid gear set.

21. A right angle gearbox according to claim 20 wherein said shaft comprises a keyway formed therein, said bore configured to engage a portion of a shaft key placed in said keyway.

* * * * *

UNITED STATES PATENT AND TRADEMARK OFFICE
CERTIFICATE OF CORRECTION

| | | |
|---|---|---|
| PATENT NO. | : 8,474,347 B2 | Page 1 of 1 |
| APPLICATION NO. | : 12/480379 | |
| DATED | : July 2, 2013 | |
| INVENTOR(S) | : Brick et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 847 days.

Signed and Sealed this
Ninth Day of December, 2014

Michelle K. Lee
*Deputy Director of the United States Patent and Trademark Office*